United States Patent
Shimoji

(10) Patent No.: US 6,650,670 B1
(45) Date of Patent: Nov. 18, 2003

(54) POLYCRYSTALLINE CERAMIC LASER

(76) Inventor: Yutaka Shimoji, 2125 University Ct., Clearwater, FL (US) 33764

( * ) Notice: Subject to any disclaimer, the term of this patent is extended or adjusted under 35 U.S.C. 154(b) by 519 days.

(21) Appl. No.: 09/615,265

(22) Filed: Jul. 13, 2000

(51) Int. Cl.$^7$ .................................................. H01S 3/14
(52) U.S. Cl. ........................................ 372/39; 372/41
(58) Field of Search .................... 372/39–43, 75, 372/38.06

(56) References Cited

U.S. PATENT DOCUMENTS

| | | | |
|---|---|---|---|
| 3,897,358 A | | 7/1975 | Greskovich et al. ..... 252/301.1 |
| 4,217,558 A | * | 8/1980 | Aprahamian et al. ......... 372/89 |
| 4,953,166 A | * | 8/1990 | Mooradian .................... 372/21 |
| 4,965,803 A | * | 10/1990 | Esterowitz et al. ............. 372/5 |
| 5,008,890 A | * | 4/1991 | McFarlane .................... 372/41 |
| 5,289,482 A | * | 2/1994 | Esterowitz et al. ........... 372/41 |
| 5,295,146 A | * | 3/1994 | Gavrilovic et al. ........... 372/41 |
| 5,327,444 A | * | 7/1994 | Mooradian .................... 372/44 |
| 5,388,114 A | * | 2/1995 | Zarrabi et al. ................. 372/22 |
| 5,491,708 A | * | 2/1996 | Malone et al. ................. 372/41 |
| 5,508,235 A | * | 4/1996 | Marker ........................... 501/7 |
| 5,541,948 A | * | 7/1996 | Krupke et al. ................. 372/41 |
| 5,574,740 A | * | 11/1996 | Hargis et al. .................. 372/41 |
| 5,677,921 A | * | 10/1997 | Schaffers et al. ............. 372/41 |
| 5,751,751 A | * | 5/1998 | Hargis et al. .................. 372/41 |
| 5,805,626 A | * | 9/1998 | Komatsu et al. ............... 372/41 |
| 5,914,975 A | * | 6/1999 | Kuwano ........................ 372/41 |
| 6,246,711 B1 | * | 6/2001 | Stultz et al. ................... 372/92 |
| 6,370,172 B1 | * | 4/2002 | Bowman ....................... 372/34 |
| 6,466,600 B1 | * | 10/2002 | Von Borstel ................. 372/61 |

OTHER PUBLICATIONS

T. Taira et al "Performance of Highly $Nd^{3+}$—Doped YAG Ceramic Microchip Laser" CLEO'99 Technical Digest p136 (May 1999).

kresue et al. Fabrication and Optical Properties of High-–Performance Polycrystalline Nd: YAG Ceramics for Sol-id–State Lasers J. AM. Cerma. Soc. 78 p1033 (1995).

* cited by examiner

Primary Examiner—Paul Ip
Assistant Examiner—Tuan Nguyen

(57) ABSTRACT

Composite lasers made of contiguous layers of pure and doped polycrystalline ceramics are introduced. The close thermal contact between such layers of the same ceramic allows an efficient and low cost way to take full advantage of the higher allowed dopant concentrations and, therefore, of the higher maximum output laser power afforded by polycrystalline ceramic lasers. Many novel, unique examples are provided, which demonstrate the versatility and commercial merit of polycrystalline ceramic composite lasers.

13 Claims, 5 Drawing Sheets

POLYCRYSTALLINE CERAMIC LASER

BACKGROUND

This invention relates to polycrystalline ceramic composite lasers. Ikesue et al. disclose "Fabrication . . . of Polycrystalline Nd:YAG Ceramics for . . . Lasers" in J. Am. Ceram. Soc., vol. 78(4), p. 1033–40 (1995). Greskovich et al. disclose in U.S. Pat. No. 3897358 a method of pressing and sintering polycrystalline laser material. Taira, Ikesue and Yoshida have disclosed efficient laser operation of Nd:YAG polycrystalline ceramic microchips in "Performance . . . Nd-doped YAG Ceramic Microchip Lasers", in CLEO'99 Technical Digest, p. 136 (May /1999). It is taught that this new polycrystalline ceramic form allows higher doping, which provides 10 times higher absorption of pump energy, and it is reported that the maximum output power is four times higher than that of Nd:YAG single crystal.

However, due to higher absorption coefficient of these highly doped polycrystalline ceramics, experimental laser specimens of the prior art generate excessive heat that degrades the various coatings required to form optical laser cavities. This has resulted in the premature failure of the laser cavity. Therefore, there is a need to produce a polycrystalline laser that can efficiently dissipate the additional heat generated therein during laser operation to allow long term, reliable laser operation.

SUMMARY

An object of the present invention is to provide a polycrystalline laser having a means of dissipating heat efficiently, so that the optical coatings maintain their integrity during long-term laser use. Another object of the present invention is to provide various novel, unique embodiments of end-pumped and side-pumped polycrystalline lasers which can survive long term use. Another object of the present invention is to provide a polycrystalline laser that accomplishes the above objects at low energy consumption and low manufacturing cost.

These and other objects of the present invention are achieved in the present invention by a doped polycrystalline laser ceramic being contiguous with an undoped or pure, polycrystalline ceramic. The pure, undoped ceramic portion functions to efficiently dissipate the heat generated within the doped laser ceramic during laser operation. Low energy consumption is provided by the higher absorption of the doped polycrystalline, because of the higher allowed dopant concentrations. Low manufacturing cost is achieved by creating the laser gain material and the heat sink out of the same ceramic, thus minimizing the number of different materials that must be assembled.

BRIEF DESCRIPTION OF PREFERRED EMBODIMENTS

Figure 1A:
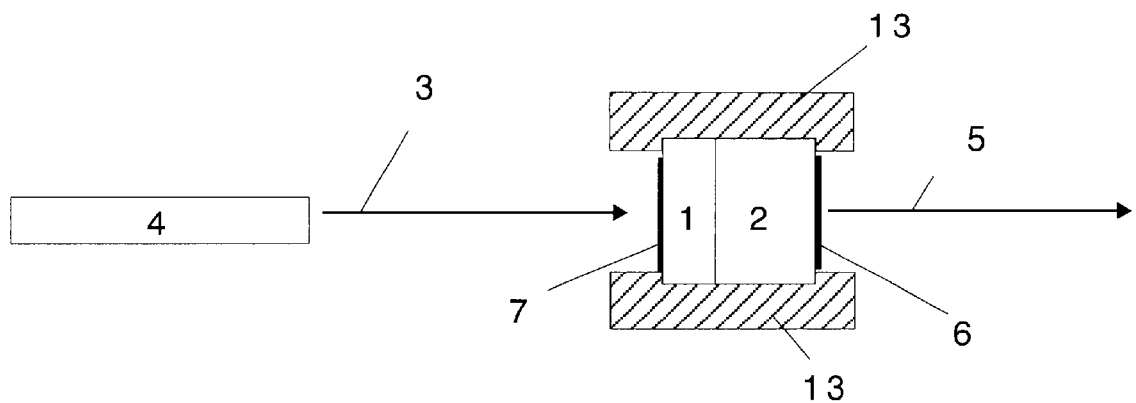
FIG. 1A shows an end-pumped laser with a doped polycrystalline layer and a pure polycrystalline layer within a laser optical cavity.

The present invention relates to polycrystalline ceramic lasers. Polycrystalline ceramics are characterized by allowing much higher dopant concentrations than single crystals. Ten times higher absorption of pump laser energy and four times the output laser power is provided by polycrystalline, Nd:YAG, for example, compared with the single crystal form. The extra heat generated by the higher pump laser energy absorption is a serious problem, because it degrades the optical coatings, which form the laser cavity. This problem is solved by the present invention by providing an undoped, or pure, polycrystalline ceramic heat sink 1, which is contiguous with doped polycrystalline laser portions 2 of the same ceramic.

In all of the preferred embodiments shown in FIGS. 1–6 a ceramic polycrystalline composite laser comprises a chosen ceramic composition having at least one sintered, polycrystalline doped portion 2 and at least one sintered polycrystalline pure portion 1. The percent dopant ion concentration within the doped portion 2 is at least 2%, so that the pump laser light absorption coefficient within the doped portion 2 is at least 15 cm$^{-1}$. In a preferred embodiment polycrystalline YAG is doped with Nd at a concentration of 5%, so that the absorption coefficient is 75 cm$^{-1}$. This is higher than that dopant concentration which would, normally, produce concentration quenching, lattice deformation, and defects in a single crystal of the same material. The doped portion 2 is contiguous with the pure portion 1 and made of the same ceramic. A laser cavity exists between at least two appropriate coatings, and contains at least the doped polycrystalline portion 2. The pure polycrystalline portion 1 conducts heat away from the doped portion 2 with excellent efficiency. The doped portion 2 is pumped by at least one pump laser light 3 emitted from at least one pump laser 4, which is preferably a diode laser. The doped portion 2 emits at least one emitted laser beam 5 of a different wavelength than that of the pump laser light 3, when pumped by the pump laser light 3. The chosen polycrystalline ceramic is any one selected from the group consisting of $Mg_2SiO_4$, YAG, $LiCaAlF_6$, YLF, and $YVO_4$, and the dopant is any ion made from an element selected from the group consisting of Nd, Ce, Cr, Yb, Er, Ho, Tm, and Pr. The doped portion 2 is, alternatively, co-doped with at least two different dopant ion species made from any of the above stated elements.

In FIG. 1A at least two end-faces of the doped portion 2 of the polycrystalline ceramic are end-pumped. There is a partially reflective coating 6 at an emitted laser beam wavelength on an end-face of the doped portion 2, and opposite from that end on the pure portion 1 there is a highly reflective coating 7 at an emitted laser beam wavelength and highly transmissive at the pump laser light wavelength. The polycrystalline composite of doped portion 1 and doped portion 2 are in thermal contact with a metal heat sink 13 of high thermal conductivity such as copper, for example.

Figure 1B:
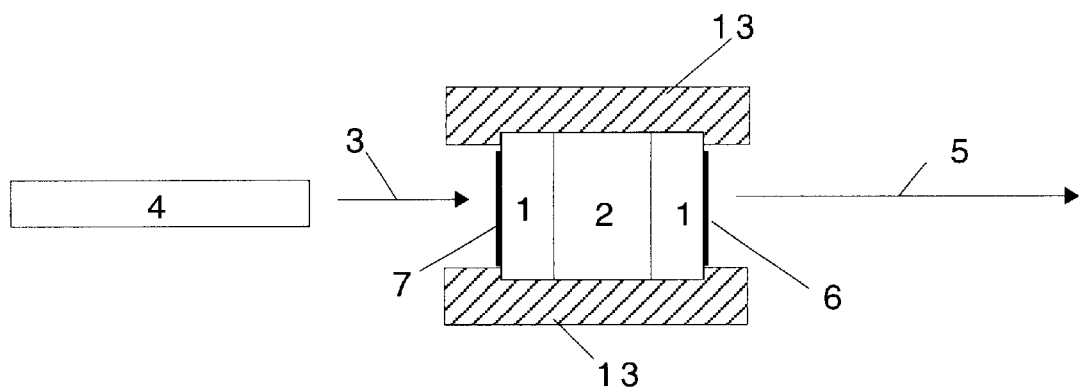
FIG. 1B shows an end-pumped laser with a doped polycrystalline layer between two pure polycrystalline layers all within a laser optical cavity.

In FIG. 1B the doped portion 2 is located between two pure portions 1 of a polycrystalline ceramic. The partially reflective coating 6 and the highly reflective coating 7, as described above, form the laser cavity and are on either end of the composite laser. The entire polycrystalline ceramic composition is in thermal contact with a metal heat sink 13.

Figure 1C:
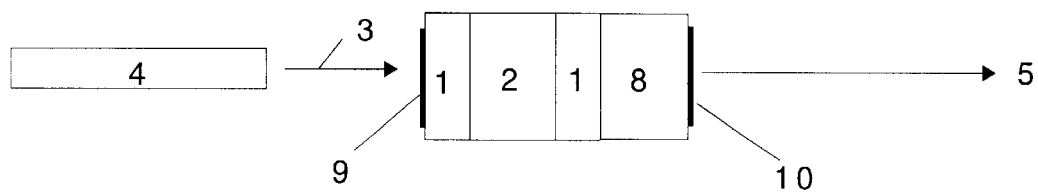
FIG. 1C shows the laser of FIG. 1B with a frequency doubler inside the laser cavity.

FIG. 1C shows the laser of FIG. 1B except that a frequency doubling material 8 is in optical contact with an outer end-face of one of the pure portions 1 and inserted inside the laser cavity. The frequency doubling material 8 reduces the wavelength of the output laser light 5 to one half of that of the beam emitted by the doped portion 2, so the coatings must have a different structure. An end face of the pure portion 1 nearest to the pump laser 4 is coated with an input coating 9, which is highly reflective at the wavelength emitted by the doped portion 2 and highly transmissive at the pump laser light wavelength. The other pure portion 1 on the opposite end is coated with an output coating 10, which is highly reflective at the wavelength emitted by the doped portion 2 and highly transmissive at one half of the wavelength emitted by the doped portion 2.

Figure 2:
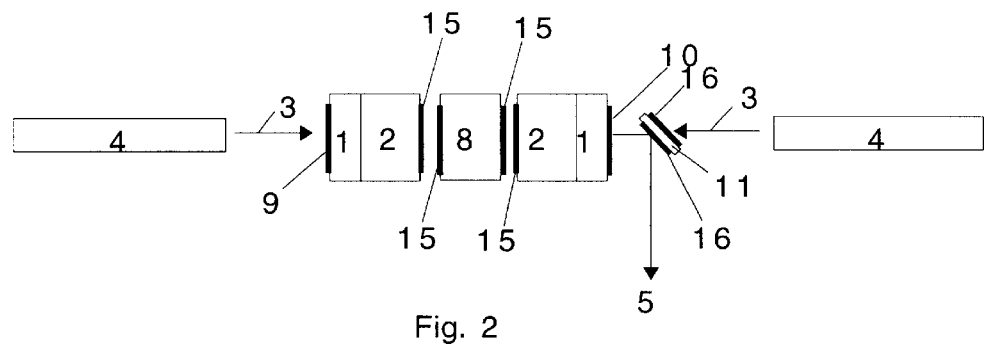
FIG. 2 shows the laser of FIG. 1B having the doped polycrystalline layer split into two halves with a frequency doubler spaced between them.

FIG. 2 shows the laser of FIG. 1B except that the doped portion 2 is split in half and a frequency doubling material 8 is spaced therebetween. An end-face of one of the pure portions 1 is coated with an output coating 10 which is highly reflective at the wavelength emitted by the doped portion 2 and highly transmissive at one half of the wavelength emitted by the doped portion 2. The other pure portion 1 on the opposite end is coated with an input coating 9 which is highly reflective at the wavelength emitted by the doped portion 2 and highly transmissive at the pump laser light wavelength. Pumping is done from both ends. There is a partial mirror 11 coated with appropriate optical coatings 16 in the path of the output laser light 5 to divert and deliver the output laser light 5. There are dual band antireflection coatings 15 on either side of the gaps between the frequency doubling material 8 and the doped portions 2.

Figure 3:
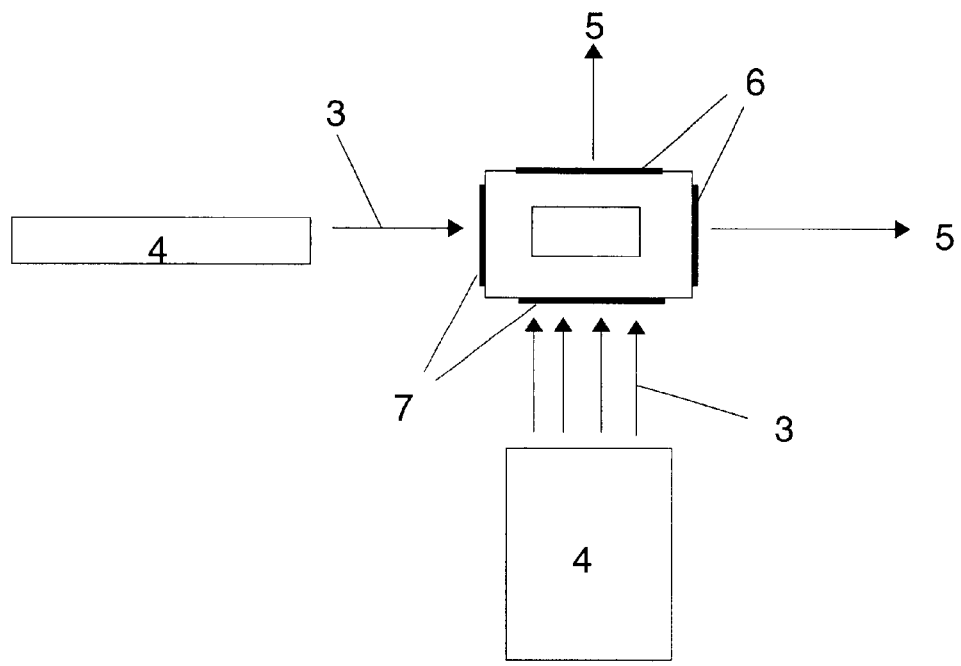
FIG. 3 shows an end-pumped laser having a doped polycrystalline ceramic entirely contained within a slab of pure polycrystalline ceramic.

FIG. 3 shows an end-pumped composite polycrystalline slab laser with a doped portion 2 completely enclosed by a pure portion 1 of a chosen polycrystalline ceramic. Appropriate partially reflective coatings 6 and highly reflective coatings 7, as described above, can be placed on any group of two opposite sides of the slab, to form optical cavities therebetween.

Figure 4A:
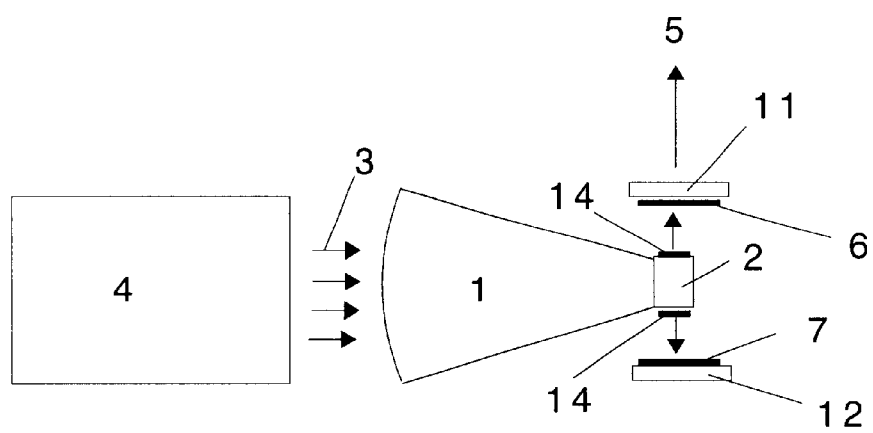
FIG. 4A shows a side-pumped laser having a doped polycrystalline ceramic having optical cavity mirrors separated spatially from opposite ends of the doped ceramic that is pumped by a diode array.
Figure 4B:
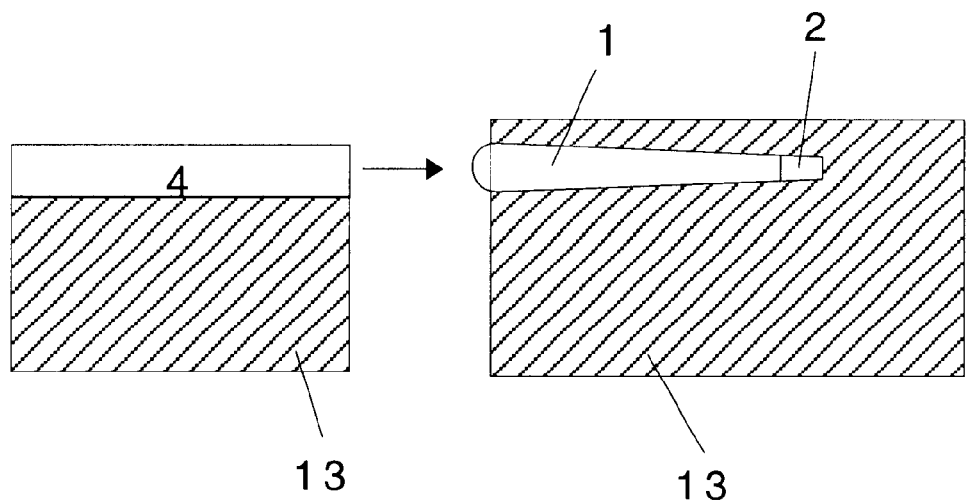
FIG. 4B shows a side view of the laser shown in FIG. 4A.

FIG. 4A shows a side-pumped laser having a doped portion 2 of a chosen polycrystalline ceramic pumped by an array of diode lasers 4. There is a partially reflective coating 6 at the emitted laser beam wavelength on a partial mirror 11 on one end, and a highly reflective coating 7 at the emitted beam wavelength on a highly reflective mirror 12 on the other end. These coatings are on mirrors, which are spaced apart from the doped portion 2. There are appropriate antireflective coatings 14 on either side of the doped portion 2 and in the path of the output laser light 5. FIG. 4B shows a side view of this laser shown in FIG. 4A in thermal contact with a metal heat sink 13, which is aluminum, for example.

Figure 4C:
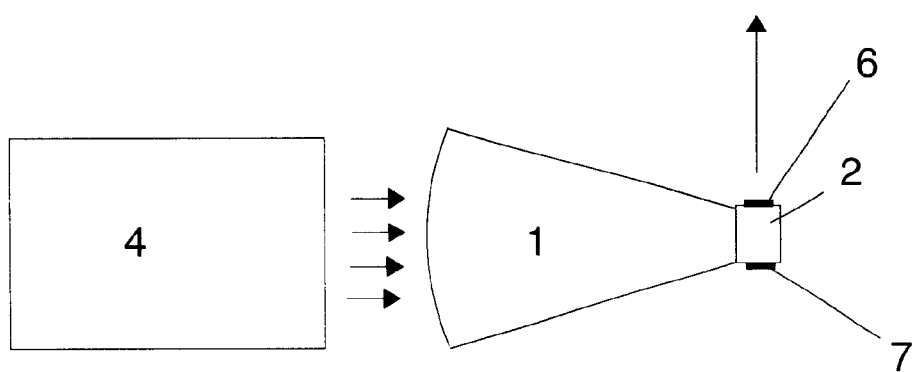
FIG. 4C shows the laser of FIG. 4A without any spatial separation between the optical laser cavity mirrors from opposite ends of the doped ceramic.

FIG. 4C shows the laser of FIG. 4A, except that the partially reflective coating 6 and the highly reflective coating 7, which form the optical cavity, are placed directly on the doped portion 2.

Figure 5:
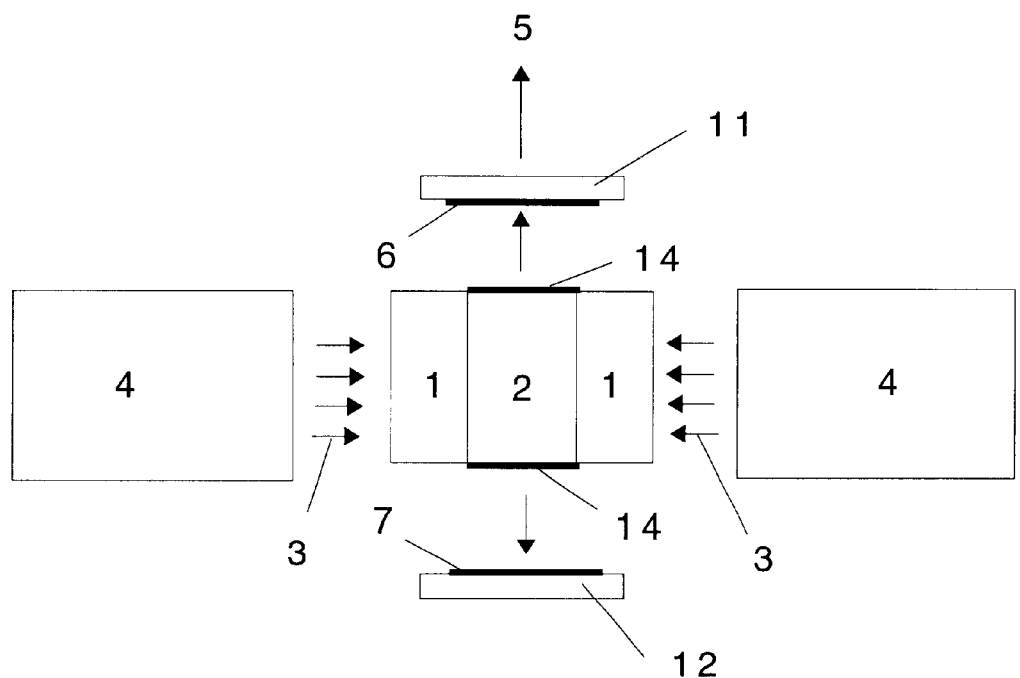
FIG. 5 shows two diode laser arrays side pumping a doped polycrystalline laser layer, which is located between two pure polycrystalline layers, and which is between spatially separated optical laser cavity mirrors on either side of the doped layer.

FIG. 5 shows a side-pumped version of the laser shown in FIG. 1B

Figure 6:
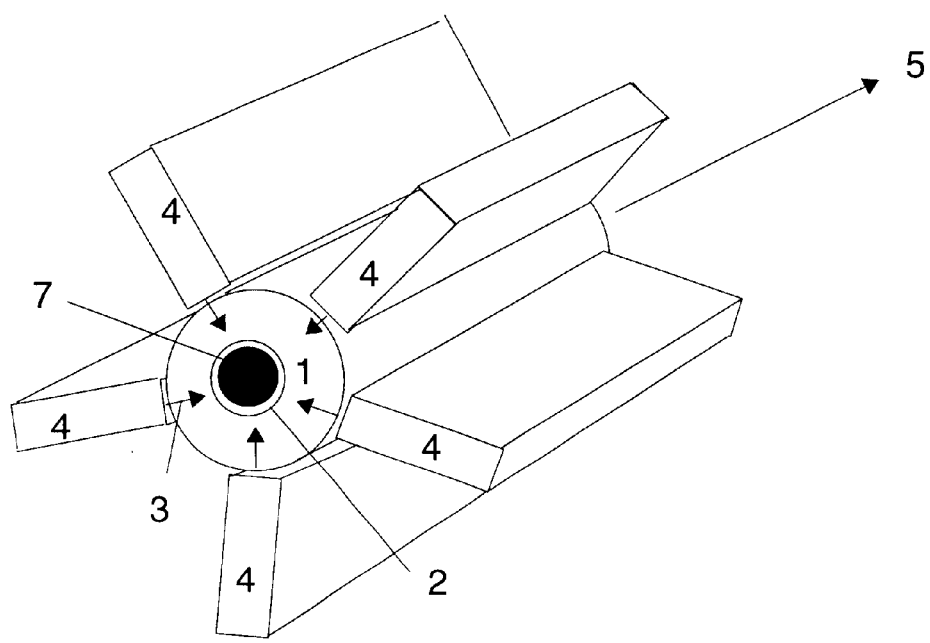
FIG. 6 shows a radially side-pumped, doped polycrystalline cylindrical rod contained within a pure polycrystalline ceramic cylindrical rod.

FIG. 6 shows a radially side-pumped cylindrical rod laser having a central rod of a doped portion 2 enclosed in a circumferentially disposed cylindrical rod of a pure portion 1 of a chosen polycrystalline ceramic. The output laser light 5 is parallel to the cylindrical rod of composite polycrystalline ceramic.

While there is shown and described herein certain specific structure embodying the invention, it will be manifest to those skilled in the art that modifications may be made without departing from the spirit and scope of the underlying inventive concept. The present invention shall not be limited to the particular forms shown and described, except by the scope of the appended claims.

What is claimed is:

1. A polycrystalline ceramic composite laser system comprising a ceramic composition having at least one hot-pressed sintered polycrystalline doped portion made of said ceramic composition, and at least one hot-pressed sintered polycrystalline pure portion made of said ceramic composition, said doped portion being coupled and continuous with said pure portion, such that said pure portion is a heat dissipating element to conduct heat away from said doped portion, said doped portion having a dopant ion concentration of at least 2% such that a pump laser light absorption coefficient within said doped portion is at least 15/cm, said doped portion being disposed to receive pump laser light between at least two coatings, a laser cavity existing between said coatings such that said laser cavity includes said doped portion, said doped portion being pumped by at least one pump laser light, said pump laser light being emitted by at least one pump laser means, said doped portion emitting at least one emitted laser beam when pumped by said pump laser light, said at least one emitted laser beam having different wavelength than a wavelength of said pump laser light.

2. The laser of claim 1 wherein said doped portion has end-pumping orientation with respect to said pump laser light.

3. The laser of claim 2 wherein at least two end faces of said doped portion are end-pumped by said pump laser light, an end face portion of said doped portion distal from said pure portion is coated with a coating which is partially reflective at a wavelength of said emitted laser beam, an end face of said pure portion is coated with a coating which is both highly reflective at a wavelength of said emitted laser beam and highly transmissive at a wavelength of said pump laser light.

4. The laser of claim 1 wherein said doped portion has a dopant concentration such that said doped portion has a pump laser light absorption coefficient of at least 15 cm$^{-1}$, said ceramic composition is made of a ceramic selected from the group consisting of $Mg_2SiO_4$, YAG, $LiCaAlF_6$, YLF, and $YVO_4$, said doped portion is doped with a dopant ion made from an element selected from the group consisting of Nd, Ce, Cr, Yb, Er, Ho, Tm, and Pr.

5. The laser of claim 4 wherein said doped portion is co-doped with at least two different dopant ions, said doped portion has a dopant concentration such that said doped portion has a pump laser light absorption coefficient of at least 20 cm$^{-1}$.

6. The laser of claim 2 wherein there are at least two pure portions of said at least one pure portion contiguous with at least two end faces of said doped portion, such that said doped portion is located between said pure portions, one of said pure portions is coated with a coating that is both highly reflective at a wavelength of said emitted laser beam and highly transmissive at a wavelength of said pump laser light, a second of said pure portions is coated with a coating which is partially reflective at a wavelength of said emitted laser beam.

7. The laser of claim 2 wherein there are at least two pure portions of said at least one pure portion contiguous with at least two end faces of said doped portion, such that said doped portion is located between said pure portions, one of said pure portions is coated with a coating which is both highly reflective at a wavelength of said emitted laser beam and highly transmissive at a wavelength of said pump laser light, a second of said pure portions has an end face distal to said doped portion which forms an optical contact with a frequency doubling material, an end face of said frequency doubling material distal to said optical contact is coated with a coating which is both highly reflective at a wavelength of said emitted laser beam and highly transmissive at one half of a wavelength of said beam.

8. The laser of claim 2 wherein there are two doped portions of said at least one doped portion, and there are at least two pure portions of said at least one pure portion, there is a frequency doubling material located between and spatially separated from said two doped portions, said frequency doubling material generating an output laser light having a wavelength which is one half of the wavelength of said emitted laser beam, said pure portions are located on opposite ends of said laser, one of said pure portions has an end face coated with a coating which is both highly reflective at a wavelength of said emitted laser beam and highly transmissive at a wavelength of said pump laser light, a second of said pure portions has an end face coated with a coating which is both highly reflective at a wavelength of said emitted laser beam and highly transmissive at one half of a wavelength of said emitted laser beam.

9. The laser of claim 2 wherein said doped portion is contained within an internal region of said pure portion.

10. The laser of claim 1 wherein said doped portion has side-pumped orientation with respect to said pump laser light.

11. The laser of claim 10 wherein said doped portion is pumped by a diode array, said diode array emits said pump laser light which is focused onto said doped portion.

12. The laser of claim 10 wherein at least two sides of said doped portion are side-pumped by said pump laser light, each of said at least two sides of said doped portion are contiguous with said pure portion.

13. The laser of claim 10 wherein said doped portion is in the geometric form of a cylindrical rod, said pure portion is contiguous with and circumferentially disposed around said doped portion, and a plurality of pump laser diodes is circumferentially disposed around said pure portion.

* * * * *